March 6, 1962 A. BECK 3,023,546
MACHINE FOR MAKING THREAD-CUTTING TOOLS
Filed July 1, 1958
Fig.1
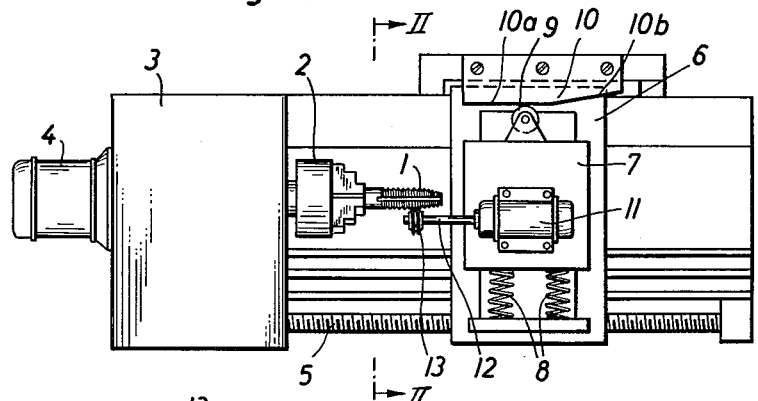
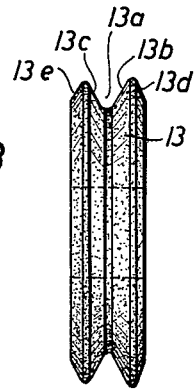
Fig.3
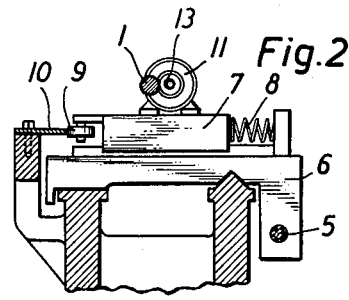
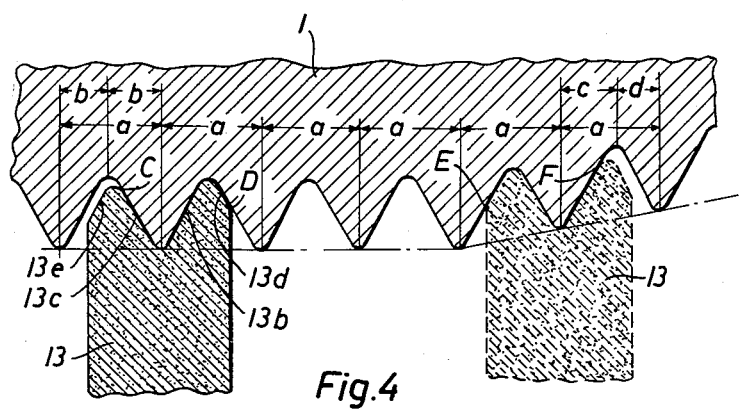
Fig.4
INVENTOR
ALFRED BECK
BY
Mestern & Kollin
ATTORNEYS

United States Patent Office 3,023,546
Patented Mar. 6, 1962

3,023,546
MACHINE FOR MAKING THREAD-CUTTING TOOLS
Alfred Beck, Hompeschstr. 8, Dusseldorf, Germany
Filed July 1, 1958, Ser. No. 746,010
Claims priority, application Germany July 3, 1957
5 Claims. (Cl. 51—32)

Screw-cutting tools such as taps, dies, thread chasers and the like have previously been made in that the teeth intended for the starting cut and arranged like the teeth of a rack were cut away obliquely at an angle of about 10–15°. In recent times, screw-cutting tools have become known in which the teeth of the starting section were fully cut out in the same way as those of the finishing section and were set back to an increasing extent relatively to the teeth of the finishing section, all the teeth having the same pitch as the thread to be cut. These tools have the great advantage as compared with the first-mentioned tools that much less power is required for cutting a thread and further, on starting to cut, an automatic alignment or adjustment of the tool takes place. A pre-requisite for satisfactory machining with a tool having starting cutting teeth which are fully cut out is, however, that all the teeth are cut very accurately so as to have the pitch of the thread.

For the manufacture of thread-cutting tools in which the fully cut-out teeth of the starting section are set back to an increasing extent relative to the teeth of the finishing section and all the teeth have the same pitch as the pitch of the thread, different processes and machines have previously been proposed. In these, however, the requirement that all the teeth have very accurately the same pitch as the thread has not been maintained with the necessary exactitude. If, for example, the shape of the cutting edges is transferred to the tool to be made by point exploration with a template, differences which may amount to several hundredths of a millimeter can occur owing to small inaccuracies of the copying device. If, as has also been proposed, a forming tool with which the grooves are machined in the work piece is used for the manufacture of screw-cutting tools, then an additional feed must be given to this tool by a separate device at the place of transition between the cutting section and the finishing section of the tool to be manufactured. In this case also inaccuracies may easily occur in particular in the drive for the additional feed, owing to play or the like, which affect the satisfactory working of the tools manufactured.

The object of the invention is to provide a machine in which the inaccuracies of the previously known methods and apparatus are obviated, so that in the machined tools all the teeth actually lie with very great accuracy in the pitch of the thread. The invention relates, therefore, to a machine for the manufacture of screw-cutting tools in which the fully cut-out teeth of the starting cutting section are set back to an increasing extent relative to the teeth of the finishing cutting section and all teeth have the same pitch as the pitch of the thread, the machine having a feed spindle for the longitudinal feed and a guide track for the cross-feed of the cutting tool. It obtains its great accuracy with regard to the position of all teeth owing to the fact that the forming tool, which is uniformly fed by the spindle along the entire length of the thread-cutting tool to be made and at the same time has its cross-feed effected by the guide track, consists of a grinding disc having a groove of which the profile corresponds to that of the peaks of the teeth to be manufactured.

According to the invention the grinding disc is grooved in such a way that one flank of its groove, which is of substantially V-shaped cross-section and defined by two peripheral ridges of inverse cross-section, is of the same length as the flanks of the teeth in the cylindrical finishing section of the screw-cutting tool to be made, and the length of the other flank of the groove corresponds to the length of the short flanks of the teeth of the frusto-conical starting cutting section of the tool. Advantageously, the two ridges and the bottom of the groove are rounded so as to conform to the shape of the base of the grooves between the teeth of the thread-cutting tool and of the peaks of these teeth.

An embodiment of the invention is illustrated, by way of example, in the accompanying drawing, in which:

FIGURE 1 shows a machine according to the invention in plan;

FIGURE 2 is a section on the line II—II of FIGURE 1;

FIGURE 3 is a side elevation of the grinding disc; and

FIGURE 4 shows on a larger scale a section through the work and the grinding disc by which it is machined.

In the machine illustrated in FIGURE 1 the three-jaw chuck 2 carrying the work piece 1 is driven from a motor 4 through a gear box 3 to rotate the work piece about its longitudinal axis. A feed spindle 5 is rotated from the gear box and serves to move forward a longitudinal support 6 which is movable on the bed of the machine in accordance with the pitch of the thread which is later to be cut by the cutting tool 1. A transverse support 7 is movable on the longitudinal support 6. The transverse support 7 is under the action of springs 8 and carries a roller 9 which bears against a guide track 10 which is detachably fixed to the machine frame. To the support 7 is fixed a rapidly rotating motor 11 which carries a grinding disc 13 on its spindle 12 whose axis is parallel to that of the work-piece holder 2 and which projects some distance from the motor. In the region 10a the guiding edge of the track 10 is parallel to the axis of the work 1 and in the region 10b it is inclined at an angle of 10–15° to this axis. Consequently, during the feed of the longitudinal support 6 by the spindle 5 the cross-feed of the grinding disc 13 is automatically adjusted in such a way that the work 1 is provided with a cylindrical finishing section and with a frusto-conical starting section.

The grinding disc 13 illustrated on a larger scale in FIGURE 3 is profiled along a serrated outline in such a manner that the shape of its groove 13a corresponds to the shape of the peaks of the cutting teeth to be made on the work 1. The flank 13b of the groove 13a has the same length as the flanks of the teeth of the finishing cutting section of the screw-cutting tool to be made, whereas the length of the other flank 13c corresponds to the length of the short flanks of the teeth of the starting cutting section. Both flanks are rounded at their junctions with outer flanks 13d and 13e, respectively, to form two annular ridges with a cross-section complementary to the shape of the base of the grooves between the teeth of the screw-cutting tool to be formed. The width of the grinding disc 13 is such that engagement between the grinding disc 13 and the work 1 takes place both when machining the finishing cutting teeth along the cylindrical portion of the work 1 and when machining the starting cutting teeth along its frusto-conical portion, the length of the helicoidal zone of contact between disc and work piece being somewhat greater than the pitch of the teeth of the work 1. These conditions are shown on a somewhat larger scale in FIGURE 4.

As shown in FIGURE 4 all the cutting teeth of the screw-cutting tool to be made are at exactly the same distance $a$ from one another, namely at a distance which is equal to the pitch of the thread which is later to be cut by the tool 1. The grooves between the teeth, however, do not have the same relationship. In the cylindrical section, that is to say in the finishing cutting section of the work, the grooves are situated exactly centrally between the teeth. Their distance from the peaks of the teeth is the same distance $b$ on both sides. In the conical starting cutting range of the work 1, however, the grooves are offset to one side relative to the teeth and the distance $c$ from one adjacent tooth is greater than the distance $d$ to the other adjacent tooth.

The eccentric positioning of the grooves results from the conical setting back of the fully cut-out teeth of the starting section. Another result of this is that the length of the two flanks of the teeth of the starting cutting section of the work 1 is not the same. Since the grinding disc 13 is profiled in such a way that the flank 13b of the groove 13a has the same length as the flanks of the teeth of the finishing cutting section of the work 1, the result is that the leading ridge 13b, 13d of the grinding disc, situated to the right of the groove 13a, engages the work 1 up to the base of the groove, the outer flank 13d of this ridge being likewise in engagement with the work. The trailing ridge 13e, 13c of the disc does not extend in the finishing section quite up to the base of the grooves in the work 1. However, the length of the line of contact between the grinding disc 13 and the work 1 is so great that, when machining the cylindrical section of the work 1, slightly more than one tooth pitch is acted upon everywhere by the grinding disc. The beginning and the end of this line of contact are indicated in FIGURE 4 by the references C and D, respectively designating a point near the crest of the trailing ridge and a point on the front face of the leading ridge of the disc. The axial spacing of the two ridges, as appears from this figure, is slightly less than the distance $a$.

When machining the conical section of the work 1, that is to say the starting cutting teeth, there is a different line of contact between the grinding disc 13 and the work 1. In this case the line of contact extends from point E on the rear face of the trailing ridge to the point F near the crest of the leading ridge. In this section also the zone of contact with the grinding disc 13 is somewhat wider than one tooth pitch. Therefore, both in the finishing section and in the starting section, the work 1 is properly machined by the grinding disc when the grinding disc 13 is uniformly fed forward by means of the spindle 5 (FIGURE 1) at a rate corresponding to an advance by the pitch $a$ of the thread and at the same time the cross-feed is adjusted by means of the edge 10b of the guide track 10 in such manner that, when operating on the starting section of the work piece, the disc 13 is advanced during each revolution by the difference between the radii of its two ridges 13b, 13d and 13c, 13e as is clearly apparent from FIG. 4.

The profiling of the grinding disc 13 can be effected in known manner by means of truing diamonds. However, truing rolls can also be used instead, the groove profile being formed in the grinding disc under heavy pressure. In order to be able to place a refinished grinding disc 13 again to the correct position relative to the axis of the work 1, the machine shown in FIGURES 1 and 2 must, of course, be provided with means for readjustment.

Though the invention is intended mainly for the finishing of rough-machined work pieces, it has the further advantage that blanks can be directly brought into the final form by the grinding disc. In this case, however, the wear on the grinding disc is very considerable so that a subsequent machining of the work with a trued grinding disc with only slight cutting away of material is to be recommended in order to ensure the necessary accuracy.

I claim:

1. A machine for making a thread-cutting tool with a cylindrical toothed portion and an adjoining frustoconical toothed portion, comprising rotatable holder means for an elongated work piece, first drive means for rotating said holder means about a first axis extending longitudinally of said work piece, a grinding disc, movable supporting means for said disc adjacent said holder means, second drive means synchronized with said first drive means for displacing said supporting means along said axis in a direction parallel thereto over a first part of a predetermined path for shaping said cylindrical portion and in a direction approaching said axis at an acute angle over a second part of said path for shaping said frustoconical portion, and third drive means for rotating said disc on said supporting means about a second axis parallel to said first axis, the rate of displacement of said supporting means along said first axis being the same on both of said parts and defining a helicoidal zone of contact of constant pitch between said disc and said work piece; said disc being provided with a peripheral leading ridge and a peripheral trailing ridge axially spaced by a distance slightly less than said pitch and defining between them a groove of substantially V-shaped cross-section, the radius of said leading ridge exceeding the radius of said trailing ridge by a distance equal to the advance of said supporting means toward said first axis in the course of a revolution of said holder means.

2. A machine for making a thread-cutting tool with a cylindrical toothed portion and an adjoining frustoconical toothed portion, comprising rotatable holder means for an elongated work piece, first drive means for rotating said holder means about a first axis extending longitudinally of said work piece, a grinding disc, movable supporting means for said disc adjacent said holder means, second drive means synchronized with said first drive means for displacing said supporting means along said axis in a direction parallel thereto over a first part of a predetermined part for shaping said cylindrical portion and in a direction approaching said axis at an acute angle over a second part of said path for shaping said frustoconical portion, and third drive means for rotating said disc on said supporting means about a second axis parallel to said first axis, the rate of displacement of said supporting means along said first axis being the same on both of said parts and defining a helicoidal zone of contact of constant pitch between said disc and said work piece; said disc being provided with a serrated profile defining a peripheral leading ridge and a peripheral trailing ridge axially spaced by a distance slightly less than said pitch, said ridges forming between them a groove of substantially V-shaped cross-section with a longer forward flank and a shorter rear flank, the radius of said leading ridge exceeding the radius of said trailing ridge by a distance equal to the advance of said supporting means toward said first axis in the course of a revolution of said holder means, said profile also including an outer flank at the front face of said leading ridge parallel to said rear flank.

3. A machine for making a thread-cutting tool with a cylindrical toothed portion and an adjoining frustoconical toothed portion, comprising rotatable holder means for an elongated work piece, first drive means for rotating said holder means about a first axis extending longitudinally of said work piece, a grinding disc, movable supporting means for said disc adjacent said holder means, second drive means synchronized with said first drive means for displacing said supporting means along said axis in a direction parallel thereto over a first part of a predetermined path for shaping said cylindrical portion and in a direction approaching said axis at an acute angle over a second part of said path for shaping said frustoconical portion, and third drive means for rotating said disc on said supporting means about a second axis parallel to said first axis, the rate of displacement of said supporting means along said first axis being the same on both of said parts and defining a helicoidal zone of contact of constant pitch between said disc and said work piece; said disc being provided with a serrated profile including a first and a second flank forming a leading peripheral ridge and a third and fourth flank forming a trailing peripheral ridge axially spaced by a distance slightly less than said pitch, said second and third flanks together constituting a groove of substantially V-shaped cross-section between said ridges, said first and third flanks being parallel to said second and fourth flanks, respectively, the length of said second flank exceeding that of said third flank to such an extent that the radial difference between said ridges equals the advance of said supporting means toward said first axis in the course of a revolution of said holder means.

4. A machine according to claim 3 wherein said profile is rounded at the junction of said flanks.

5. A machine according to claim 3 wherein said first and fourth flanks are foreshortened relatively to said second and third flanks.

References Cited in the file of this patent
UNITED STATES PATENTS

| | | | |
|---|---|---|---|
| 688,515 | Hanson | Dec. 10, | 1901 |
| 1,530,242 | Cummer et al. | Mar. 17, | 1925 |
| 1,660,468 | Bath | Feb. 28, | 1928 |
| 1,660,890 | Schramm | Feb. 28, | 1928 |
| 1,702,160 | Hanson | Feb. 12, | 1929 |
| 2,017,487 | Elliot | Oct. 15, | 1935 |
| 2,333,985 | Clark | Nov. 9, | 1943 |
| 2,426,290 | Wainwright | Aug. 26, | 1947 |

FOREIGN PATENTS

| | | | |
|---|---|---|---|
| 685,703 | Great Britain | Jan. 7, | 1953 |
| 721,868 | Great Britain | Jan. 12, | 1955 |